(12) United States Patent
Kresser et al.

(10) Patent No.: US 7,797,962 B2
(45) Date of Patent: Sep. 21, 2010

(54) METHOD OF OPERATING AN AIRCRAFT SYSTEM

(75) Inventors: Hubert Kresser, Argenbuehl (DE); Markus Hirschmann, Ravensburg (DE); Alfred Sauterleute, Heimenkirch (DE); David Lavergne, Bouloc (FR); Laurent Hartenstein, Toulouse (FR)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 1057 days.

(21) Appl. No.: 11/478,072

(22) Filed: Jun. 28, 2006

(65) Prior Publication Data

US 2009/0117840 A1    May 7, 2009

(30) Foreign Application Priority Data

Aug. 8, 2005    (DE) .................. 10 2005 037 285

(51) Int. Cl.
F25D 9/00    (2006.01)
(52) U.S. Cl. ............................. 62/401; 62/87
(58) Field of Classification Search ........... 62/87, 62/401, 172
See application file for complete search history.

(56) References Cited

U.S. PATENT DOCUMENTS

| | | | |
|---|---|---|---|
| 4,262,495 | A | 4/1981 | Gupta et al. |
| 4,546,939 | A | 10/1985 | Cronin |
| 6,526,775 | B1 | 3/2003 | Asfia et al. |
| 2003/0005719 | A1 | 1/2003 | Mitani et al. |
| 2004/0000353 | A1 | 1/2004 | Jones |

FOREIGN PATENT DOCUMENTS

| | | |
|---|---|---|
| DE | 4128078 | 3/1992 |
| DE | 19935918 | 2/2001 |
| DE | 10119433 | 8/2002 |
| DE | 10201426 | 7/2003 |
| DE | 10234968 | 2/2004 |
| DE | 10350541 | 6/2005 |
| EP | 1283165 | 2/2003 |
| EP | 1527994 | 5/2005 |
| FR | 1375757 | 10/1964 |

(Continued)

Primary Examiner—Melvin Jones
(74) Attorney, Agent, or Firm—Alleman Hall McCoy Russell & Tuttle LLP (57) ABSTRACT

The present disclosure relates to a method of operating an aircraft system, in particular for the purpose of fresh air supply, air-conditioning and pressurization of an aircraft cabin, having a first compressed air source formed by a first compressor charged with ambient air, ram air and/or precompressed air and driven by means of at least one motor and/or of at least one turbine and whose outlet is in direct or indirect communication with an aircraft cabin, said aircraft system having at least one second compressed air source whose outlet can be connected directly or indirectly to the aircraft cabin, wherein only the first compressed air source is in communication with the aircraft cabin in a first operating mode, wherein both the first and the second compressed air sources are in communication with the aircraft cabin in a second operating mode, and wherein the selection of the operating mode depends on the pressure of the ambient air such that the first operating mode is set at a high pressure of the ambient air and the second operating mode is set at a pressure of the ambient air lower in comparison.

32 Claims, 3 Drawing Sheets

FOREIGN PATENT DOCUMENTS

| | | |
|---|---|---|
| FR | 2829466 | 3/2003 |
| GB | 1083573 | 9/1967 |
| JP | 2003-240375 | 8/2003 |
| WO | WO2004/037641 | 5/2004 |
| WO | WO2004/037642 | 5/2004 |
| WO | WO2005/030583 | 4/2005 |

METHOD OF OPERATING AN AIRCRAFT SYSTEM

CROSS-REFERENCE TO RELATED APPLICATION

This application claims priority to German Patent Application Serial No. 10 2005 037 285.6 filed Aug. 8, 2005, which is hereby incorporated by reference in its entirety for all purposes.

FIELD

The present disclosure relates to a method of operating an aircraft system, in particular for the purpose of fresh air supply, air conditioning and pressurizing of an aircraft cabin, having a first compressed air source formed by a first compressor charged with ambient air, ram air and/or precompressed air and driven by means of at least one motor and/or of at least one turbine and whose outlet is in direct or indirect communication with the aircraft cabin, said aircraft system having at least one second compressed air source whose outlet can be connected directly or indirectly to the aircraft cabin.

BACKGROUND AND SUMMARY

Aircraft air-conditioning systems having compressors operated with ambient air are known in different embodiments. An aircraft air-conditioning system is known from WO 2005/030583 A1 which has three heat exchangers which are located in a ram air duct and can be connected to achieve different cooling capacities and thus different cooling of the compressed air in different manners.

An aircraft air-conditioning system is known from DE 102 34 968 A1 in which a pre-cooled bleed air flow is combined with a compressed and pre-cooled ambient air flow to form a mixed air flow which is then supplied to suitable means for the dehumidification of this mixed air flow. The means for the dehumidification of the mixed air flow consist of a combined evaporator/condenser unit through which the two airflows mixed at the mixing point are guided while increasing the size of the droplets contained therein. A further aircraft air-conditioning system is known from DE 103 50 541 A1 which is operated without bleed air and whose compressors are charged with ram air or ambient air and are driven by means of motors.

There is a problem with compressors charged with ambient air in that the ambient conditions, in particular the pressure of the compressor inlet air, vary considerably in dependence on the flight altitude. A large demanded operation range results from this which cannot be covered completely in an efficient manner by one compressor.

It is therefore the object of the present disclosure to further develop a method of operating an aircraft air-conditioning system such that the pressurization, temperature control and fresh air supply of an aircraft cabin are ensured in an efficient manner independently of the flight altitude.

This object is solved by a method of operating an aircraft system, with only a first compressed air source in communication with the aircraft cabin in a first operating mode and for both the first compressed air source and a second compressed air source in communication with the aircraft cabin in a second operating mode. The selection of the operating mode depends at least on the pressure of the ambient air such that the first operating mode is set at a high pressure of the ambient air and the second operating mode is set at a pressure of the ambient air lower in comparison. The method in accordance with the present disclosure thus works in two, or more than two, operating modes which can depend on the flight altitude and thus on the pressure of the ambient air.

In the first operating mode, the air supply is effected only with the named first compressor which can, for example, be a single-stage or also a multistage compressor. This compressor guarantees the demands on pressurization, temperature control and fresh air supply in ground operation.

In a second operating mode, that is at lower ambient pressures such as occur in flight, the demanded fresh air mass flow is made available by at least two sources. These are the named first compressor, which is charged with ambient air and is driven by means of a motor and/or of a turbine, and a further compressed air source. Provision is preferably made for the two mass flows of the compressed air sources to be mixed and thus to be supplied to the further treatment, that is cooling and dehumidification, for example, before the mixed air flow conditioned in this way is supplied to the aircraft cabin.

It is preferred for the air to be subjected to cooling prior to the entry into the aircraft cabin, with the cooling taking place by at least one ram air heat exchanger located in a ram air duct of the aircraft and/or by at least one turbine. In the first operating mode, the cooling preferably takes place both by the at least one ram air heat exchanger and by means of one or more expansion turbines integrated in the cooling process, with them preferably being coupled on a shaft to the first compressor and to the motor. One or more turbines can thus be located on the shaft with the compressor. The cooling is preferably realized by means of only one machine which is integrated in the cooling process in this way and which can have one or more turbines.

The arrangement of a plurality of expansion stages, i.e. turbines, with the compressor on one shaft has the advantage that, for example, one of the turbines can be utilized for the cooling and another turbine can be utilized for another purpose, for example for the energy recovery by the expansion of cabin air. The case is likewise naturally possible that all the turbines of an air-cycle-machine (ACM), which is an arrangement of several components located on the same shaft, are used for cooling purposes. The utilization of the individual expansion stages for different purposes can depend, for example, on certain parameters and must therefore not be identical under all conditions.

In the second operating mode, provision is preferably made for the outlet air of the first compressed air source and at least some of the outlet air of the second compressed air source to be mixed and for the mixed air flow to be subjected to cooling. The cooling can be realized as in the first operating mode by at least one ram air heat exchanger and by means of at least one expansion turbine integrated in the cooling process.

The mixing point of both flows can for example be formed by a chamber, e.g. by a chamber for the conversion of ozone or hydrocarbons.

Provision is made in a further aspect of the present disclosure for the outlet air of the first and/or second compressors or of the second compressed air source to be supplied to a jet pump at least in part. This jet pump can be arranged, for example, in the ram air duct of the aircraft and can serve the cooling of a ram air heat exchanger and/or the cooling of the motors driving the compressors.

The second compressed air source can be formed by one or more motorized single-stage or multistage second compressors charged with ambient air, ram air and/or precompressed air. It is likewise possible for the second compressed air source to be formed by engine bleed air.

The present disclosure is not restricted to a first and a second compressed air source. Any desired number of further compressed air sources can rather be connected in.

In a preferred aspect of the present disclosure, the first compressed air source and the at least one further compressed air source are connected in parallel. The compressed air sources can thus, for example, be compressors connected in parallel and charged with ambient air.

The present disclosure does not only have the advantage of efficient operation of an aircraft system in particular for the purpose of fresh air supply, air conditioning and pressurization of an aircraft cabin. A further substantial advantage may result from the redundancy based on the at least two compressed air sources per system. If, for example, the motor of one of the compressors is defective, a sufficient supply of the aircraft cabin is nevertheless provided by the other compressed air source both in ground operation and in flight operation. Redundancy also results in the case of two aircraft systems or of two aircraft air-conditioning systems which communicate with one another between themselves by means of a line (cross bleed ducting), as will be explained in more detail below.

The above recitations with respect to the first and second or further operating modes apply to the normal case. In the effect of a defect, such as on the failure of the first compressor, other connections can be made which differ from this. If, for example, the first compressor fails, provision can be made for the supply of the aircraft cabin to be carried out by means of the second compressed air source, even if the first operating mode would actually have to be selected at the prevailing ambient conditions.

In a further aspect of the present disclosure, provision is made for a water extraction circuit to be provided downstream of the compressed air sources and upstream of the cabin as well as for a turbine to be provided downstream of the water extraction circuit and for a third operating mode to be provided in which both the first and the second compressed air sources are in communication with the aircraft cabin and in which the compressed air is guided around the water extraction circuit and the turbine in a partial or complete bypass. The provision of fresh air first takes place in this mode as in the first or second operating modes. However, due to the ambient conditions at a high flight altitude, the water extraction circuit and the turbine stage can be bypassed at least partially by opening a bypass valve. Cooling now takes place in this case substantially via the ram air heat exchanger or exchangers.

Provision is made in a further aspect of the present disclosure for the air to be subjected to cooling prior to entry into the aircraft cabin, with the cooling taking place by at least one ram air heat exchanger located in a ram air duct of the aircraft and by one or more expansion turbines which are charged completely or partially and which are seated with the first compressor on a shaft. Provision is preferably made for the cooling to be realized in addition to the ram air heat exchanger or exchangers by means of only one ACM which is integrated in the cooling air process and which can in turn have one or more turbines. This turbine or these turbines is/are preferably coupled to the compressor and the motor on a shaft.

Since the second or the further compressed air sources are preferably only switched in from a certain altitude in flight in accordance with the present disclosure, they can be used at least partially for the demand of the cooling air for the ram air heat exchangers on the ground, that is in the first operating mode.

It is possible in this process for the compressor extracted air to be supplied via regulation valves or check valves partially or exclusively to a jet pump integrated in the fan chamber of the ram air duct. This jet pump ensures the cooling air flow via the ram air heat exchangers. The jet pump can be made with sound-absorbing measures such as a specific shape of the flow cross-section and/or specific sound-absorbing layers. It is generally also possible to connect the second compressed air source to a jet pump in a different operating mode to the first operating mode. Generally, the first compressor can also be in communication with a jet pump irrespective of the operating mode.

It is likewise possible for an impeller, which is integrated in the ram air duct or the fan chamber (plenum), to be utilized for the suction of ambient air via the ram air heat exchanger or exchangers. The impeller is coupled with the motor compressor on a shaft. The air transported by the compressor which is also running in this solution can either be blown out to ambient or be utilized in the ram air duct for the support of the fan via a jet pump or be supplied to further consumers.

It is further possible to arrange one or more fans independently of the compressor or compressors. One or more fans can thus be provided which are used for the cooling of the compressor motor or motors and/or of the ram air heat exchanger or exchangers and which are not coupled to the compressors or are not seated with them on a shaft.

The fan chamber can have branches in the flow guidance. Provision can be made in this process for the ram air duct to have one or more partition walls extending in the flow direction at least sectionally which divide the ram air duct into at least two sections, with a jet pump communicating with the second compressed air source or an impeller coupled to the second compressor being arranged in the first section and with the second section representing a bypass of the first section for the air flowing through the ram air duct. The cooling air of the ram air heat exchangers is preferably transported under ground conditions in the first section. The jet pump and the impeller are arranged in this section, with them being able to be arranged jointly in one branch or separately in adjacent branches. The cooling air of the ram air heat exchangers is preferably transported under flight conditions in the second section. A bypass of the jet pump or of the impeller thus results whereby the transmission is increased. This bypass—or another branch—supports the secure ventilator operation in which a recirculation flow is enabled, provided the fan is coupled to a compressor.

A further section can be provided in the ram air duct in which a jet pump and/or a fan is/are arranged for the purpose of cooling the motors driving the compressors.

Provision is thus made in a further aspect of the present disclosure for a jet pump or a fan to be provided for the purpose of cooling one or more motors driving the compressor or compressors.

The time of the switching in of the parallel compressors or compressed air sources can depend on different criteria.

It is possible to switch over from the first to the second operating mode when the packing limit of the first compressor is reached or when the maximum motor power of the first compressor is reached. Providing the same motor size with all compressors is possible, which requires an earlier switching in of the additional compressors.

When the second compressor or the second or a further compressed air source per pack is switched in, a halving/reduction of the mass flow for the first compressor takes place since the second compressor or the further compressed air source now transports the mass flow now lacking to cover the required fresh air amount. This can have the result that the new operating point can lie in the instable range to the left of the pump limit (surge line) at least for the first compressor. Different measures can be taken to enable a secure, that is stable, operation.

It is possible to increase the fresh air amount for the cabin in the second operating mode and also in the third operating mode. An increase in the fresh air amount is generally also possible in other operating modes, e.g. in the first operating mode.

It is likewise possible to increase the mass flow via the compressor stages through recirculation, with a valve (anti-surge valve (ASV)) being able to be arranged in the recirculation line. This increase in throughflow does not serve the increase in the fresh air amount, but only the component security. Such a recirculation is possible irrespective of the operating mode, i.e. it can be selected in the first, second, third operating modes, etc.

It is furthermore possible that, in the first or second operating mode, the outlet air of the first compressor and/or of the compressors is supplied to the second compressed air source and/or to a further compressed air source via a jet pump via the ram air duct of the aircraft or to further consumers of the aircraft. This method of operation is possible in the first or second operating modes, but also in other operating modes.

This also results in operation of the compressors in the stable range for any desired mode.

These further consumers can, for example be the systems OBOGS, OBIGGS, WAI (wing anti-ice) or a further heating/cooling. It is furthermore possible to utilize the outlet air for the engine start or for the start of an auxiliary engine (APU).

To limit the required motor power, the transmission of the pack can be increased in dependence on the demanded cooling capacity and on the air dehumidification via the water extraction circuit. Different possibilities are available for this purpose:

It is possible to adapt the required motor power ideally via a variable turbine guidance apparatus via an adaptation of the cross-sectional area. The important design point for the turbine nozzle is the ground case with maximum cooling capacity and high air humidity. As the flight altitude increases, an increase in the size of the nozzle area is necessary. The control of this turbine guide apparatus can take place, for example, electrically, electropneumatically or also purely pneumatically.

The transmission can furthermore be increased in that a bypass line is opened at a large flight altitude at low ambient humidity which bypasses the water extraction circuit and the turbine. This is possible because additional dehumidification is not necessary at high flight altitudes. The valve BPV is arranged in this bypass line. With a fully open BPV, the required cooling capacity must be achieved by the ram air heat exchanger since the turbine stage is almost completely bypassed due to the higher transmission of the bypass line. If a higher cooling capacity is necessary, the BPV may only move into regulation to achieve additional turbine cooling capacity or other cooling capacity, whereby a higher pressure ratio of the compressors and thus more motor power is required.

Provision can further be made for a common control unit to be provided for the valve TCV, which is disposed in a line which connects the outlet of the compressed air source or the mixed air line to the outlet of the turbine, and for this guide apparatus, whereby only one single actuator is required for this control.

On the ground and at a low flight altitude, it can be necessary to take suitable measures to increase the heating capacity of the air-conditioning system. Different possibilities are likewise available for this purpose.

It is possible to allow some of the compressed air to recirculate via the compressors for the purpose of increasing temperature, whereby the temperature of the process air is increased and thus the heating capability of the air-conditioning system is also increased.

It is likewise possible to increase the outlet temperature by a valve for the throttling of the compressors and, on the other hand, to enable a bypass of the turbine stage.

It is furthermore possible to design the guide apparatus of the turbine via variable changes in the cross-sectional surface such that the heating capability of the air-conditioning system is also thereby ensured under ground conditions.

It is furthermore possible to influence the heating capacity in that the ram air amount is reduced. This can take place in that the ram air duct is closed partially or fully by means of a flap or valve controlled via an actuator. It is likewise possible to reduce or cut off the compressed air supplying the jet pump located in the ram air duct or to change the pressure level and the throughput.

A further possibility consists of adapting the power of the impeller located in the ram air duct.

The motor cooling can be realized by the use of ambient air or ram air or by means of a liquid coolant circuit or two-phase coolant circuit. A separate jet pump must optionally be provided for the motor cooling duct. The cooling can take place by means of ambient air or ram air.

The water extraction circuit of the air-conditioning system may include a reheater, a condenser downstream of it on the compressed air side and a water extractor downstream of it. This water extraction circuit can generally also be designed without a reheater.

Provision is made in a further aspect of the present disclosure for a first air-conditioning system and a second air-conditioning system to be arranged which are operated according to one or more of the above methods, with the second compressed air source being formed by two motorized compressors charged with ambient air, ram air or pre-compressed air or by two other compressed air sources such as engine bleed sources, with one of the second compressed air sources being switched in to both air-conditioning systems in the second operating mode and with the second compressed air sources being switched in to one each of the two air-conditioning systems in a further operating mode. Such a method has the advantage that the reduction in the mass flows for the first compressors of the air-conditioning system does not turn out to be so strong on the change from the first to the second operating mode since the mass flow of the switched in compressor or of the switched in compressed air source is first divided between both air-conditioning systems.

This effect can naturally also be realized in that the second compressed air source is only formed by a motorized compressor charged with ambient air, ram air or precompressed air or only by a bleed air source. This one second compressed air source can be switched in to both air-conditioning systems or both aircraft systems at reduced capacity in the second operating mode so that the reduction of the mass flow of the first compressor only turns out relatively low. In a further operating mode, the second compressed air source can be switched in to both air-conditioning systems with a mass flow higher in comparison.

The connection of second air-conditioning systems or aircraft systems by a connection line results in a likewise redundant design so that a fault case in one of the air-conditioning packs or systems can be compensated largely or completely.

BRIEF DESCRIPTION OF THE FIGURES

Further details and advantages of the present disclosure will be explained in more detail with reference to an embodiment shown in the drawings. There are shown.

DETAILED DESCRIPTION

Figure 1:
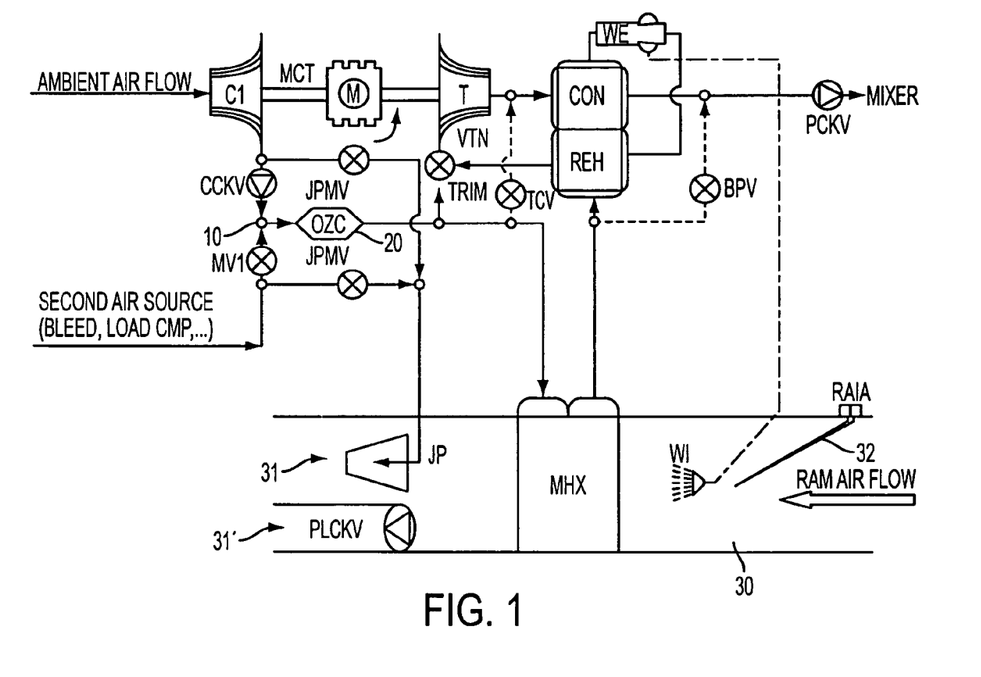
FIG. 1 shows a schematic representation of an aircraft air-conditioning system to which the method in accordance with the present disclosure is applied.

FIG. 1 shows, with reference numeral C1, a first compressor charged with ambient air. It is in communication with a motor M and an expansion turbine T on a shaft. The total unit is called an MCT (motorized compressor turbine). The swung arrow in the region of the motor M is intended to indicate its cooling, for example by means of a jet pump or a fan, which can be arranged e.g. in the ram air duct. The same applies correspondingly to FIGS. 2 and 3.

A further compressed air source, "second air source", is provided in addition to the compressed air source and is switched in depending on the operating mode in which the system is operated. This compressed air source can be switched in or off or also partially switched in by means of the valve MV1 (modulating valve 1). A check valve can also be arranged instead of the valve MV1. This second compressed air source can, for example, be a second motorized compressor charged with ambient air or also bleed air from the engine of the aircraft. The outlet line of the compressor C1 has a check valve CCKV which ensures that the flow through this outlet line does not lead toward the compressor.

The outlet lines of the compressor C1 and of the further compressed air source are connected to one another at a mix point 10. A chamber 20 is located downstream of the mix point in which, for example, a converter for ozone and/or for hydrocarbons (OZC) can be arranged.

The ram air heat exchanger MHX is located downstream of this chamber and is arranged in the ram air duct 30 of the aircraft, as can be seen from FIG. 1. The ram air duct heat exchanger MHX is in communication with a water extraction circuit consisting of a reheater REH, a condenser CON and a water extractor WE on the outlet side, with the components being arranged in the order reheater, condenser and water extractor. The water extractor WE is in communication with the cold side of the reheater REH on the outlet side. On the outlet side, the cold side of the reheater is in communication with the turbine T, which is connected upstream of the turbine T, via a guide apparatus VTN (variable turbine nozzle). The cold turbine outlet air flows through the condenser CON on its cold side and is then supplied to a mixing chamber or to the aircraft cabin after passing through a check valve PCKV (pack check valve).

The water separated in the water extractor WE is supplied to the ram air duct 30 via a water injector WI, as can be seen from FIG. 1. A ram air duct inlet valve 32 is located at the inlet side of the ram air duct and can be moved into different positions by means of the RAIA (ram air inlet actuator).

The ram air duct is divided into two sections 31 and 31' on the ram air side downstream of the ram air duct heat exchanger MHX. The jet pump JP is located in the section shown above and is in communication with the outlet lines of the compressors or compressed air sources via valves JPMV (jet pump modulating valve).

A line extends from the mixed air line downstream of the chamber 20 and upstream of the ram air duct heat exchanger MHX to the outlet side of the turbine T in which a valve TCV (temperature control valve) is arranged. Furthermore, a bypass line is provided which leads from the outlet side of the ram air duct heat exchanger MHX to the line of the air-conditioning system leading to the mixing chamber. The valve BPV (bypass valve) is located in this line.

In one example, the system may include an air-cycle-machine (ACM) configuration. For example in FIG. 1 the compressor C1, the motor M and the turbine T may be located on the same shaft and form an air-cycle-machine. The structure components of the air-cycle-machine may depend on individual requirements. It is for example possible to provide an air-cycle-machine without a motor, with two compressors, etc.

The system of FIG. 1 is operated as follows. In a first operating mode, the total fresh air is only made available by the compressor C1. The latter is preferably made with a single-stage, with a multistage design generally also being possible. This compressor serves to guarantee the demands with respect to pressurization, temperature regulation and fresh air supply. The compressor outlet air is first cooled in the ram air duct heat exchanger MHX after passing through the chamber 20. This air subsequently flows through the water extraction circuit and is then subjected to a second cooling in the single turbine T in the cooling process. The turbine power serves, together with the power of the motor M, the drive of the compressor C1. The cold turbine outlet air serves the condensation of the humidity of the outlet air of the ram air duct heat exchanger in the condenser CON.

In a second operating mode, the valve MV1, or a check valve, is opened and the fresh air mass flow is now formed by the outlet air of the compressor C1 and by the compressed air flow of the second compressed air source. In the second operating mode, the mixed air flow flows through the same components as the outlet air of the compressor C1 in the first operating mode.

In a third operating mode, the provision of the fresh air first takes place as in the second operating mode. However, due to the ambient conditions at a high flight altitude, the water extraction circuit and the turbine stage can be bypassed at least partially by opening the valve BPV. The cooling in the third operating mode now takes place substantially by means of the ram air duct heat exchanger MHX.

Due to the high demanded pressure ratio of the individual compressor stages based on single-stage compression, these compressor stages only achieve a limited operating range for the corrected mass flow. To be able to deliver the mass flow (volume flow) corrected as the flight altitude increases, influenced by falling compressor inlet pressure, additional compressor stages or compressed air sources are switched in parallel in dependence on the flight altitude. The number of ambient air compressors utilized is not fixed in this connection, with a parallel connection of at least two compressed air sources per pack (air-conditioning system) taking place to cover the total application area.

As can furthermore be seen from FIG. 1, the second compressed air source can be used with an open valve JPMV to operate the jet pump JP. This has the result that a coolant air flow is also ensured in the first operating mode via the ram air heat exchanger or exchangers. As can further be seen from FIG. 1, the compressor outlet air of the compressor C1 can also be supplied to the jet pump via a valve JPMV. Such a procedure is in particular sensible to ensure a safe/stable operation of the compressor C1. The additional mass flow is thereby directed via the jet pump JP into the ram air duct or is alternatively supplied to further consumers.

To increase the transmission of the air-conditioning system, the cross-sectional surface can be adjusted via a variable turbine guide apparatus. The unit TVN of the turbine T serves this purpose. The unit can be controlled with the valve TCV serving for the temperature control by means of a common actuator.

Figure 2:
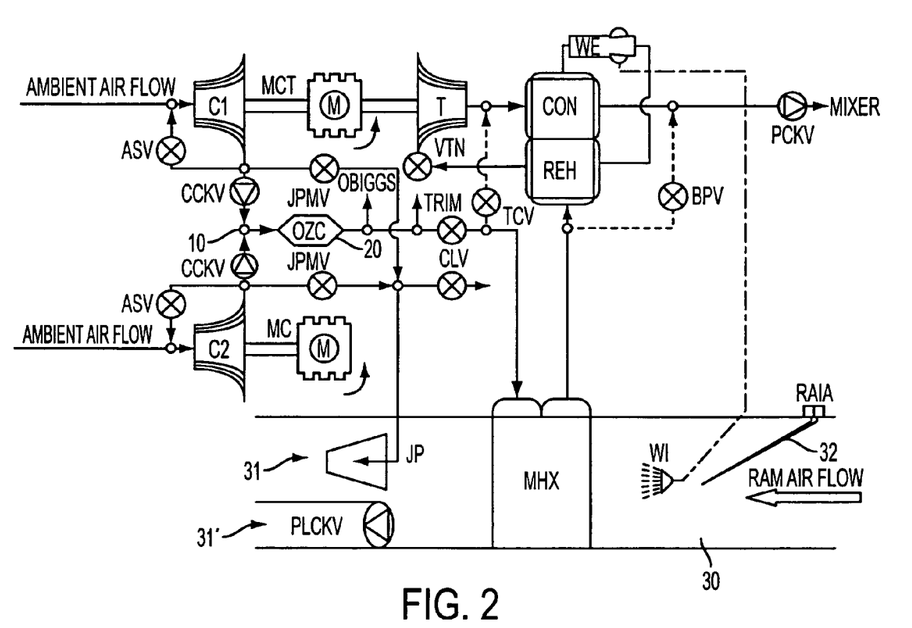
FIG. 2 shows a schematic representation of the aircraft air-conditioning system of FIG. 1 in a particular embodiment.

FIG. 2 shows an aspect of the arrangement of FIG. 1, with the second compressed air source being formed by a compressor C2 which is driven by a motor M. A turbine is not provided so that an arrangement MC (motorized compressor) is obtained. One or more of these units can also be provided. The operating method of the air-conditioning system shown in FIG. 2 corresponds to that explained with reference to FIG. 1 so that reference is made accordingly. In addition to FIG. 1, recirculation lines which can be closed by a valve ASV (antisurge valve) are drawn for the compressors C1 and C2. Furthermore, a further valve CLV (compressor load valve) is provided in the line extending from the chamber 20 to the ram air duct heat exchanger MHX. The recirculation air can be increased via the compressor by opening the valve ASV, whereby a safe, stable operation of the compressors C1, C2 is enabled. As stated above, the increase in the compressor mass flow can also be realized via the jet pump modulating valves JPMV. The valve CLV shown in FIG. 2 serves the restriction of the compressors C1, C2 by which the exit temperature of the compressors C1, C2 is increased.

Figure 3:
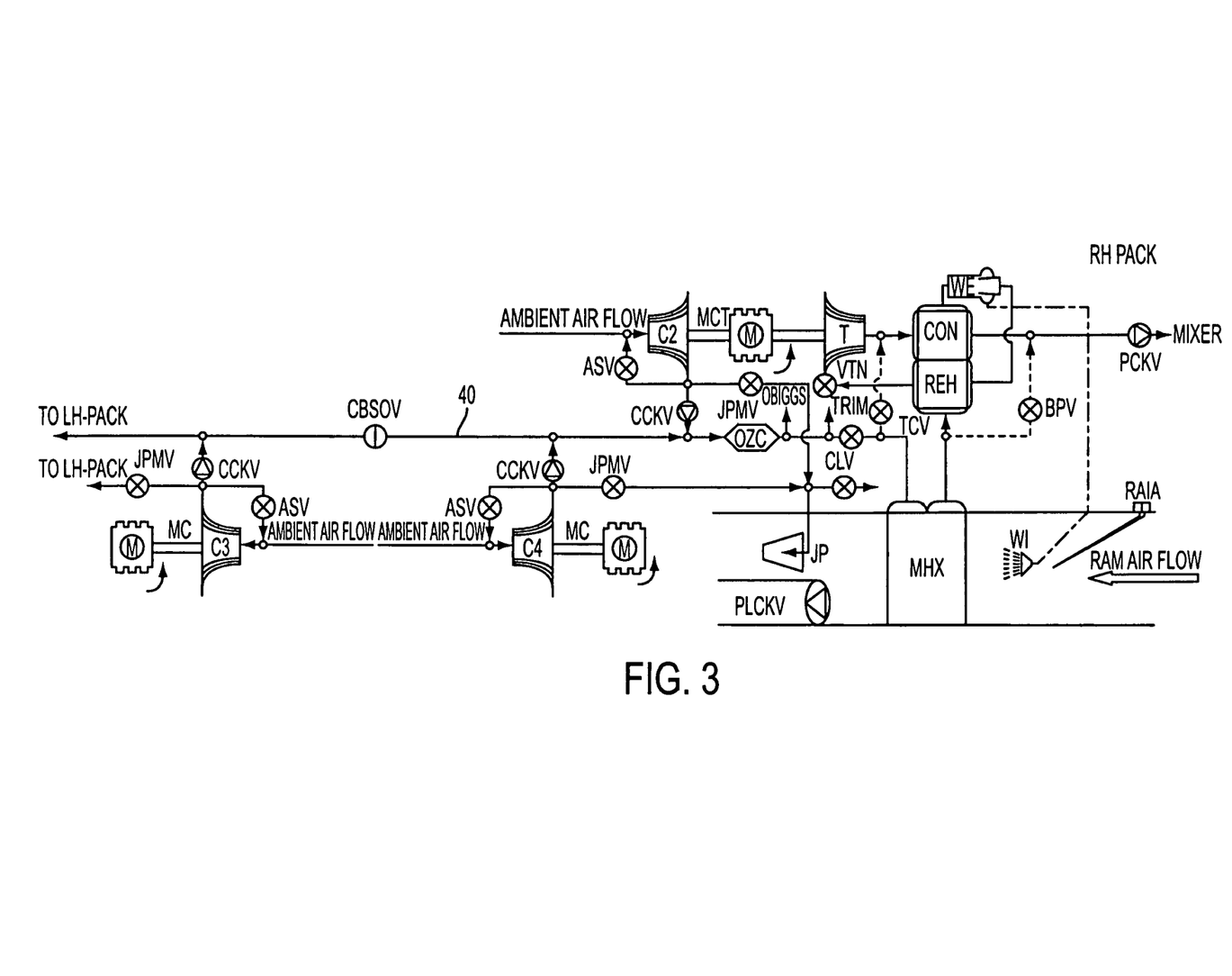
FIG. 3 shows a schematic representation of the aircraft air-conditioning system for the carrying out of the method in accordance with the present disclosure.

FIG. 3 shows a further variant of an air-conditioning system operated according to the method in accordance with the present disclosure. The operation of the air-conditioning system explained with reference to FIG. 1 and FIG. 2 results for ground operation and low flight altitudes. The arrangement of FIG. 3 enables the step-wise switching in of the motorized compressors C3 and C4 charged with ambient air, whereby the problem is reduced that the compressors C1 and C2 of the right hand or left hand pack are operated in the unstable range.

Provision is made in accordance with FIG. 3 that only one of the additional compressors C3 or C4 is operated in parallel with the compressors of the LH and RH packs from a certain flight altitude. This has the consequence that the reduction in the mass flows for the first compressors C1 and C2 does not turn out so strong and an operating point in the stable range (to the right of the pump limit (surge line)) remains possible. To split the mass flow of the switched in compressor (C3 or C4) to both packs, they are connected to one another via a line 40 (cross bleed ducting). The valve CBSOV (cross bleed shut-off valve) is arranged in this line and the line 40 can be opened or closed by means of it.

The connection of both air-conditioning systems by the cross bleed ducting results in a redundant embodiment since each of the air-conditioning systems can be connected to compressed air sources associated with the other air-conditioning system as required.

At a greater flight altitude, the further additional compressor (C3 or C4) can also be switched in parallel. The valve CBSOV is closed so that two separate packs are again operated comparably with the second operating mode with respect to FIG. 1 and FIG. 2.

The invention claimed is:

1. A method of operating an aircraft system for the purpose of fresh air supply, air-conditioning and pressurization of an aircraft cabin, having a first compressed air source formed by a first compressor charged with ambient air, ram air and/or precompressed air and driven by means of at least one motor and/or of at least one turbine and whose outlet is in direct or indirect communication with the aircraft cabin, said aircraft system having at least one second compressed air source whose outlet can be connected directly or indirectly to the aircraft cabin, comprising: operating in a first operating mode where only the first compressed air source is in communication with the aircraft cabin, and operating in a second operating mode where both the first and the second compressed air sources are in communication with the aircraft cabin, wherein a selection of an operating mode depends on a pressure of the ambient air such that the first operating mode is selected at a high pressure of the ambient air and the second operating mode is selected at a pressure of the ambient air lower in comparison.

2. The method in accordance with claim 1, wherein air compressed by the first or second compressed air sources is subjected to cooling prior to entry into the aircraft cabin, with the cooling taking place by a ram air heat exchanger located in a ram air duct of the aircraft system and/or by at least one turbine.

3. The method in accordance with claim 2, wherein at least one turbine is located with the first compressor on a shaft.

4. The method in accordance with claim 1, wherein, in the second operating mode, outlet air of the first compressor and at least some outlet air of the second compressed air source are mixed and the mixed air flow is subjected to cooling.

5. The method in accordance with claim 1, wherein outlet air of the first compressor is supplied at least partially to a jet pump.

6. The method in accordance with claim 1, wherein the second compressed air source is formed by one or more motorized second compressors charged with ambient air.

7. The method in accordance with claim 1, wherein the second compressed air source is made such that it provides engine bleed air.

8. The method in accordance with claim 1, wherein the aircraft system further includes a water extraction circuit downstream of the first and second compressed air sources and upstream of the cabin as well as a turbine downstream of the water extraction circuit, the method further comprising operating in a third operating mode where both the first and the second compressed air sources are in communication with the aircraft cabin and in which air compressed by the first or second compressed air sources is guided around the water extraction circuit and the turbine in a partial or complete bypass.

9. The method in accordance with claim 1, wherein the air is subjected to cooling prior to the entry into the aircraft cabin, with the cooling taking place by one or more ram air heat exchangers located in a ram air duct of the aircraft and by one or more completely or partially charged turbines which are seated with the first compressor on a shaft.

10. The method in accordance with claim 1, wherein, in the first operating mode, the second compressed air source is connected such that its outlet air is supplied to a jet pump arranged in a ram air duct with at least one ram air heat exchanger.

11. The method in accordance with claim 1, wherein the second compressed air source is formed by one or more motorized second compressors charged with ambient air, with the first compressor and/or at least one of the one or more motorized second compressors being coupled to an impeller which is arranged in a ram air duct with at least one ram air heat exchanger, the method further comprising operating the impeller in the first operating mode for at least partial transport of air through the ram air heat exchanger.

12. The method in accordance with claim 1, wherein a switchover is made from the first to the second operating mode when a packing limit of the first compressor is reached or when a maximum motor power of the first compressor is reached.

13. The method in accordance with claim 1, wherein, in the second operating mode, an air mass supplied to the aircraft cabin is increased with respect to the first operating mode.

14. The method in accordance with claim 1, wherein the outlet of the first compressor and/or of compressors of the second compressed air source and/or of a further compressed air source are connected to respective compressor inlets for the purpose of producing a recirculation flow.

15. The method in accordance with claim 1, wherein outlet air of the first compressor and/or outlet air of a second compressed air source and/or outlet air of a further compressed air source is supplied via a jet pump into a ram air duct of the aircraft or to a further consumer of the aircraft.

16. The method in accordance with claim 15, wherein the further consumer is selected from the group OBOGS, OBIGGS, WAI (wing anti-ice), supplemental cooling/heating or wherein the outlet air is utilized for the start of an engine or auxiliary engine.

17. The method in accordance with claim 1, wherein the aircraft system has a turbine which is in communication with the outlet of the first compressed air source and/or the second compressed air source, the method further comprising changing a cross-sectional surface of the turbine by means of a turbine guide apparatus to increase a transmission of the aircraft system.

18. The method in accordance with claim 8, wherein the compressed air is supplied via compressors to the first compressed air source and/or to a further compressed air source for increasing air temperature.

19. The method in accordance with claim 1, wherein a restriction of outlet lines of the first compressor of the first compressed air source and/or outlet lines of a compressor of a further compressed air source takes place for increasing air temperature.

20. The method in accordance with claim 1, wherein a ram air amount guided through a ram air duct of the aircraft is reduced for increasing air temperature.

21. The method in accordance with claim 20, wherein a ram air duct inlet can be closed at least partly by a flap or valve which is controlled via an actuator.

22. The method in accordance with claim 1 wherein the aircraft system further has a first air-conditioning system and a second air-conditioning system, with the second compressed air source being formed by two, or more than two, motorized compressors charged with ambient air, ram air or precompressed air or by two, or more than two, engine bleed sources, with the second compressed air source being switched into both air-conditioning systems in the second operating mode and with the second compressed air source being switched into a respective one of the two air-conditioning systems in a further operating mode.

23. The method in accordance with claim 1, wherein the aircraft system further has a first air-conditioning system and a second air-conditioning system, with the second compressed air source being formed by a motorized compressor charged with ambient air, ram air or precompressed air or by an engine bleed air source, with the second compressed air source being switched into both air-conditioning systems with a lower mass flow in the second operating mode and with the second compressed air source being switched into both air-conditioning systems with a mass flow higher in comparison in a further operating mode.

24. A system for an aircraft, the system for the purpose of fresh air supply, air-conditioning and pressurization of an aircraft cabin, comprising:
  a first compressed air source formed by a first compressor charged with ambient air, ram air and/or precompressed air and driven by at least one motor and/or at least one turbine and whose outlet is in direct or indirect communication with the aircraft cabin,
  at least one second compressed air source whose outlet can be connected directly or indirectly to the aircraft cabin, wherein only the first compressed air source is in communication with the aircraft cabin in a first operating mode, wherein both the first and the second compressed air sources are in communication with the aircraft cabin in a second operating mode, and wherein the second operating mode includes a higher ambient pressure than the first operating mode.

25. The system in accordance with claim 24, further comprising further compressed air sources, in addition to the first and second compressed air sources, whose outlets can be connected directly or indirectly to the aircraft cabin.

26. The system in accordance with claim 24, wherein the first compressed air source and the at least one second compressed air source are connected in parallel.

27. The system in accordance with claim 24, further comprising a jet pump and/or a fan for cooling at least one motor driving at least one compressor of the system.

28. The system in accordance with claim 24, further comprising one or more fans for cooling at least one motor driving at least one compressor of the system and/or cooling at least one ram air heat exchanger not coupled to a compressor.

29. The system in accordance with claim 28, wherein air compressed by the first or second compressed air sources is subjected to cooling prior to entry into the aircraft cabin, with the cooling taking place by a ram air heat exchanger located in a ram air duct of the aircraft and/or by at least one turbine, and wherein the ram air duct comprises one or more partition walls extending in the flow direction at least sectionally which divide the ram air duct into at least two sections, with a jet pump communicating with the second compressed air source or an impeller coupled to a second compressor being arranged in the first section and with the second section forming a bypass of the first section for the air flowing through the ram air duct.

30. The system in accordance with claim 29, further comprising a further section in the ram air duct in which a jet pump and/or a fan is/are arranged for the purpose of motor cooling.

31. The system in accordance with claim 24, wherein the outlet air of the first compressor and outlet air of at least one further compressed air source are combined at a mixing point, with the mixing point being formed by a chamber, in particular by a chamber for the conversion of ozone and/or hydrocarbons.

32. The system in accordance with claim 24 further comprising a line connecting an inlet line of the ram air heat exchanger to the outlet of the turbine in which a TCV valve (TCV: temperature control valve) is arranged and, a common control unit for the TCV valve and for a turbine guide apparatus.

* * * * *